(12) United States Patent
Harner et al.

(10) Patent No.: US 12,643,298 B2
(45) Date of Patent: Jun. 2, 2026

(54) TURBINE ENGINE EROSION COATING REPAIR

(71) Applicant: RTX Corporation, Farmington, CT (US)

(72) Inventors: John Michael Harner, Florence, MA (US); Sonia A. Martinez, Port Saint Lucie, FL (US); David J. Mathiau, Jr., East Hartford, CT (US); Peter George Miner, East Granby, CT (US)

(73) Assignee: RTX Corporation, Farmington, CT (US)

( * ) Notice: Subject to any disclaimer, the term of this patent is extended or adjusted under 35 U.S.C. 154(b) by 214 days.

(21) Appl. No.: 18/224,727

(22) Filed: Jul. 21, 2023

(65) Prior Publication Data

US 2025/0026092 A1     Jan. 23, 2025

(51) Int. Cl.
*B29C 73/10* (2006.01)
*F01D 5/00* (2006.01)

(52) U.S. Cl.
CPC .............. *B29C 73/10* (2013.01); *F01D 5/005* (2013.01); *F05D 2230/80* (2013.01)

(58) Field of Classification Search
CPC ...... B29C 73/10; F01D 5/005; F05D 2230/80
See application file for complete search history.

(56) References Cited

U.S. PATENT DOCUMENTS

| | | | |
|---|---|---|---|
| 5,958,166 A * | 9/1999 | Walters | B29C 73/32 |
| | | | 29/402.09 |
| 10,094,220 B2 | 10/2018 | Vontell, Sr. et al. | |
| 10,927,277 B2 * | 2/2021 | Krull | B32B 15/08 |
| 10,927,684 B2 | 2/2021 | Bogue et al. | |
| 10,995,242 B2 | 5/2021 | Ibsen | |
| 11,408,371 B1 | 8/2022 | Holland et al. | |
| 2008/0248300 A1 | 10/2008 | Bogue et al. | |
| 2010/0276065 A1 | 11/2010 | Blanchard et al. | |
| 2016/0017712 A1 | 1/2016 | Vontell, Sr. et al. | |
| 2018/0345608 A1 | 12/2018 | Eigner | |
| 2020/0070448 A1 | 3/2020 | Schoeppel et al. | |

OTHER PUBLICATIONS

European extended search report dated Mar. 10, 2025 for European Patent Application No. 24189782.6.
European partial search report dated Dec. 16, 2024 for European Patent Application No. 24189782.6.

* cited by examiner

*Primary Examiner* — Patricia L. Nordmeyer
(74) *Attorney, Agent, or Firm* — Bachman & LaPointe, P.C.

(57) ABSTRACT

A patch has: a silicone body; a primer on an underside of the body; a silicone adhesive on the primer; and a release strip on the adhesive. The body has a plurality of perforations.

20 Claims, 10 Drawing Sheets

TURBINE ENGINE EROSION COATING REPAIR

BACKGROUND

The disclosure relates to turbofan engines. More particularly, the disclosure relates to erosion coatings.

Gas turbine engines (used in propulsion and power applications and broadly inclusive of turbojets, turboprops, turbofans, turboshafts, industrial gas turbines, and the like) may feature erosion coatings. As discussed below, one area of interest is in low temperature section coatings (fan section and lower pressure portions of the compressor section(s).

U.S. Pat. No. 10,094,220B2 (the '220 patent), Vontell, Sr. et al., Oct. 9, 2018, entitled "Turbine Engine Repair Methods", the disclosure of which is incorporated by reference herein in its entirety as if set forth at length, discloses an adhesive-backed patch is created by the spray-application of an adhesive to one surface of a cured erosion coating (e.g., silicone).

US Patent Application Publication 20180345608A1 (the '608 publication), Eigner, Dec. 6, 2018, entitled "Aircraft Repair Patch Applicator Tool", the disclosure of which is incorporated by reference herein in its entirety as if set forth at length, discloses an apparatus and method for patch application.

SUMMARY

One aspect of the disclosure involves a patch comprising: a silicone body; a silicone adhesive; and a release strip on the adhesive. The body has a plurality of perforations.

In a further embodiment of any of the foregoing embodiments, additionally and/or alternatively, a silane primer is on an underside of the body and a silicone adhesive is on the primer.

In a further embodiment of any of the foregoing embodiments, additionally and/or alternatively, the adhesive is a peroxide-cured silicone.

In a further embodiment of any of the foregoing embodiments, additionally and/or alternatively, the release strip is a second release strip and the patch further comprises a first release strip on the silicone body.

In a further embodiment of any of the foregoing embodiments, additionally and/or alternatively, the first and second release strips are coated fabric.

In a further embodiment of any of the foregoing embodiments, additionally and/or alternatively, a density of the perforations is 2.0 perforations to 10.0 perforations per square centimeter.

In a further embodiment of any of the foregoing embodiments, additionally and/or alternatively, a method for patching a damaged polymeric erosion coating on a gas turbine engine component using the patch comprises: removing a portion of the coating around a damage site; priming the component; removing the release strip to expose the adhesive; applying the patch so that the adhesive contacts the component; and rolling the patch with a roller.

In a further embodiment of any of the foregoing embodiments, additionally and/or alternatively, the priming is with a silane primer.

In a further embodiment of any of the foregoing embodiments, additionally and/or alternatively, the method further comprises applying pressure to the patch and heating the patch while the pressure is applied.

In a further embodiment of any of the foregoing embodiments, additionally and/or alternatively, the method is performed in situ with the engine on an aircraft.

In a further embodiment of any of the foregoing embodiments, additionally and/or alternatively, the damage site is along a fan inlet strut or fan exit strut, e.g., along a leading edge of a fan inlet strut or fan exit strut.

In a further embodiment of any of the foregoing embodiments, additionally and/or alternatively, the damage site has a polymer matrix composite substrate.

In a further embodiment of any of the foregoing embodiments, additionally and/or alternatively, a method for manufacturing the patch comprises: forming the silicone body on a first release ply and at least partially curing the silicone body on the first release ply; perforating the silicone body to form the perforations; applying the adhesive to a second release ply for forming the release strip; applying a primer to the perforated silicone body; and marrying the primed perforated silicone body to the adhesive.

A further aspect of the disclosure involves, a method for manufacturing a patch, the method comprising: applying a silicone patch material to a first release ply; at least partially perforating the silicone patch material; applying a primer to the perforated patch material; applying an adhesive to a second release strip; marrying the primed perforated silicone patch material to the adhesive.

In a further embodiment of any of the foregoing embodiments, additionally and/or alternatively, the applying the silicone patch material to the first release ply comprises spraying of the silicone patch material.

In a further embodiment of any of the foregoing embodiments, additionally and/or alternatively the perforating the silicone patch material comprises passing across a roller having a plurality of protrusions that at least partially penetrate the silicone patch material to perforate.

In a further embodiment of any of the foregoing embodiments, additionally and/or alternatively, the perforating is a perforating of at least 50% of a thickness of the silicone patch material.

In a further embodiment of any of the foregoing embodiments, additionally and/or alternatively, the perforating is a partial perforating of 50% to 99% of a thickness of the silicone patch material.

In a further embodiment of any of the foregoing embodiments, additionally and/or alternatively, the applying the primer to the perforated patch material comprises spraying.

In a further embodiment of any of the foregoing embodiments, additionally and/or alternatively, the method further comprises a partial curing in an oven of the applied silicone patch material before the perforating.

In a further embodiment of any of the foregoing embodiments, additionally and/or alternatively, the applying the adhesive to the second release strip comprises spraying.

In a further embodiment of any of the foregoing embodiments, additionally and/or alternatively, the marrying the primed perforated silicone patch material to the adhesive comprises contacting the primed perforated silicone patch material to the adhesive and applying pressure via a roller.

Another aspect of the disclosure involves a method for patching a damaged polymeric erosion coating on a gas turbine engine component using a patch having a partially perforated patch material. The method comprises: removing a portion of the coating around a damage site; priming the component; applying the patch to the component; and rolling the patch with a roller, trapped air venting through the perforations.

In a further embodiment of any of the foregoing embodiments, additionally and/or alternatively, the vented air passes outward from the perforations by diffusion through or rupturing of a zone of intact material.

The details of one or more embodiments are set forth in the accompanying drawings and the description below. Other features, objects, and advantages will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
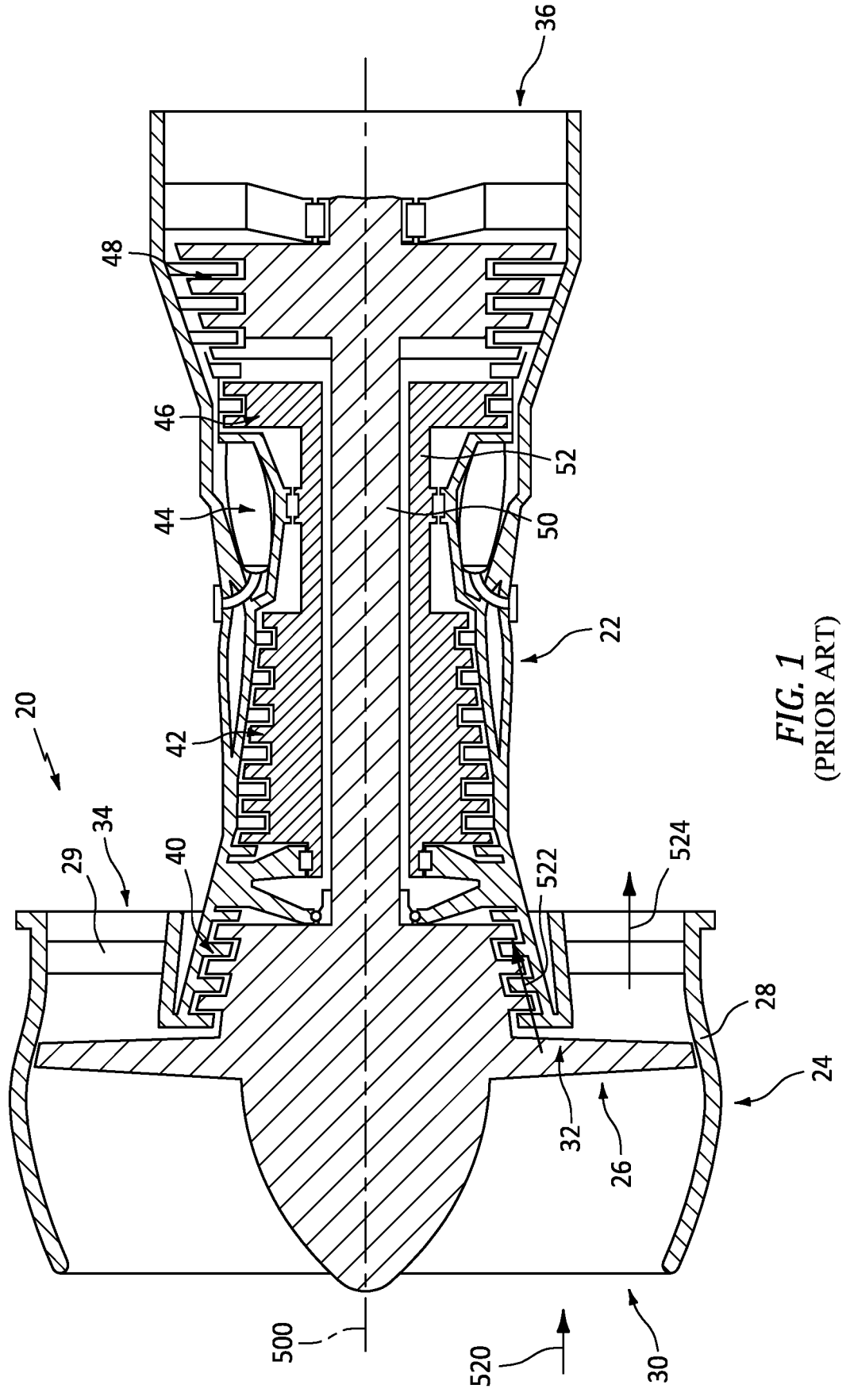
FIG. 1 is a partially schematic longitudinal sectional view of a gas turbine engine.

FIG. 1 shows a gas turbine engine 20 having an engine case 22 surrounding a centerline or central longitudinal axis 500. An example gas turbine engine is a turbofan engine having a fan section 24 including a fan 26 within a fan case 28 held spaced apart from the engine case by a circumferential array of fan struts 29. The example engine includes an inlet 30 at an upstream end of the fan case receiving an inlet flow along an inlet flowpath 520. The fan 26 has one or more stages 32 of fan blades. Downstream of the fan blades, the flowpath 520 splits into an inboard portion 522 being a core flowpath and passing through a core of the engine and an outboard portion 524 being a bypass flowpath exiting an outlet 34 of the fan case.

The core flowpath 522 proceeds downstream to an engine outlet 36 through one or more compressor sections, a combustor, and one or more turbine sections. The example engine has two axial compressor sections and two axial turbine sections, although other configurations are equally applicable. From upstream to downstream there is a low pressure compressor section (LPC) 40, a high pressure compressor section (HPC) 42, a combustor section 44, a high pressure turbine section (HPT) 46, and a low pressure turbine section (LPT) 48. Each of the LPC, HPC, HPT, and LPT comprises one or more stages of blades which may be interspersed with one or more stages of stator vanes.

In the example engine, the blade stages of the LPC and LPT are part of a low pressure spool mounted for rotation about the axis 500. The example low pressure spool includes a shaft (low pressure shaft) 50 which couples the blade stages of the LPT to those of the LPC and allows the LPT to drive rotation of the LPC. In the example engine, the shaft 50 also drives the fan. In the example implementation, the fan is driven via a transmission (not shown, e.g., a fan gear drive system such as an epicyclic transmission) to allow the fan to rotate at a lower speed than the low pressure shaft.

The example engine further includes a high pressure shaft 52 mounted for rotation about the axis 500 and coupling the blade stages of the HPT to those of the HPC to allow the HPT to drive rotation of the HPC. In the combustor 44, fuel is introduced to compressed air from the HPC and combusted to produce a high pressure gas which, in turn, is expanded in the turbine sections to extract energy and drive rotation of the respective turbine sections and their associated compressor sections (to provide the compressed air to the combustor) and fan.

Figure 2:
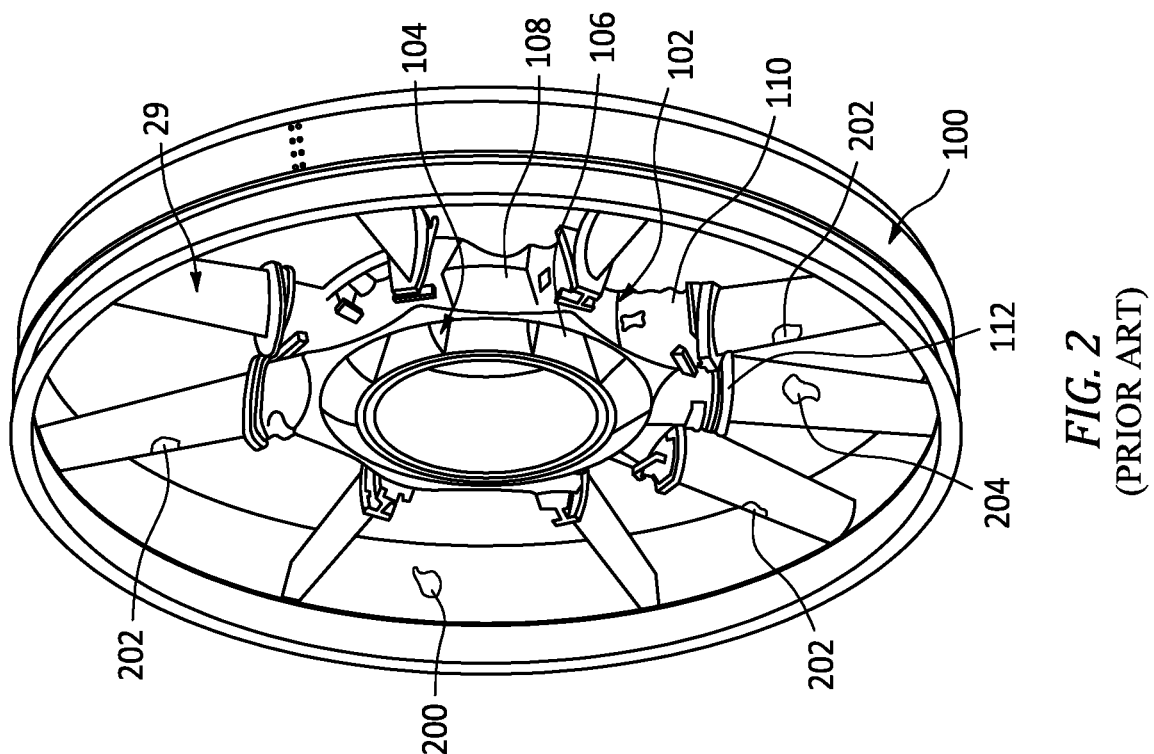
FIG. 2 is a view of a fan exit guide vane and compressor intermediate case assembly.

FIG. 2 shows an assembly of a fan exit case (including the exit guide vanes 29 and a circumscribing hoop structure 100) and a compressor intermediate case 102 (wherein a circumferential array of struts 104 structurally join an inner wall 106 of the core flowpath to an outer wall 108). The outer wall bears radial struts 110 that mate with inboard flanges 112 of the fan exit guide vanes 29 proximate the core nacelle (not shown) which defines the inboard boundary of the bypass flowpath.

Figure 3:
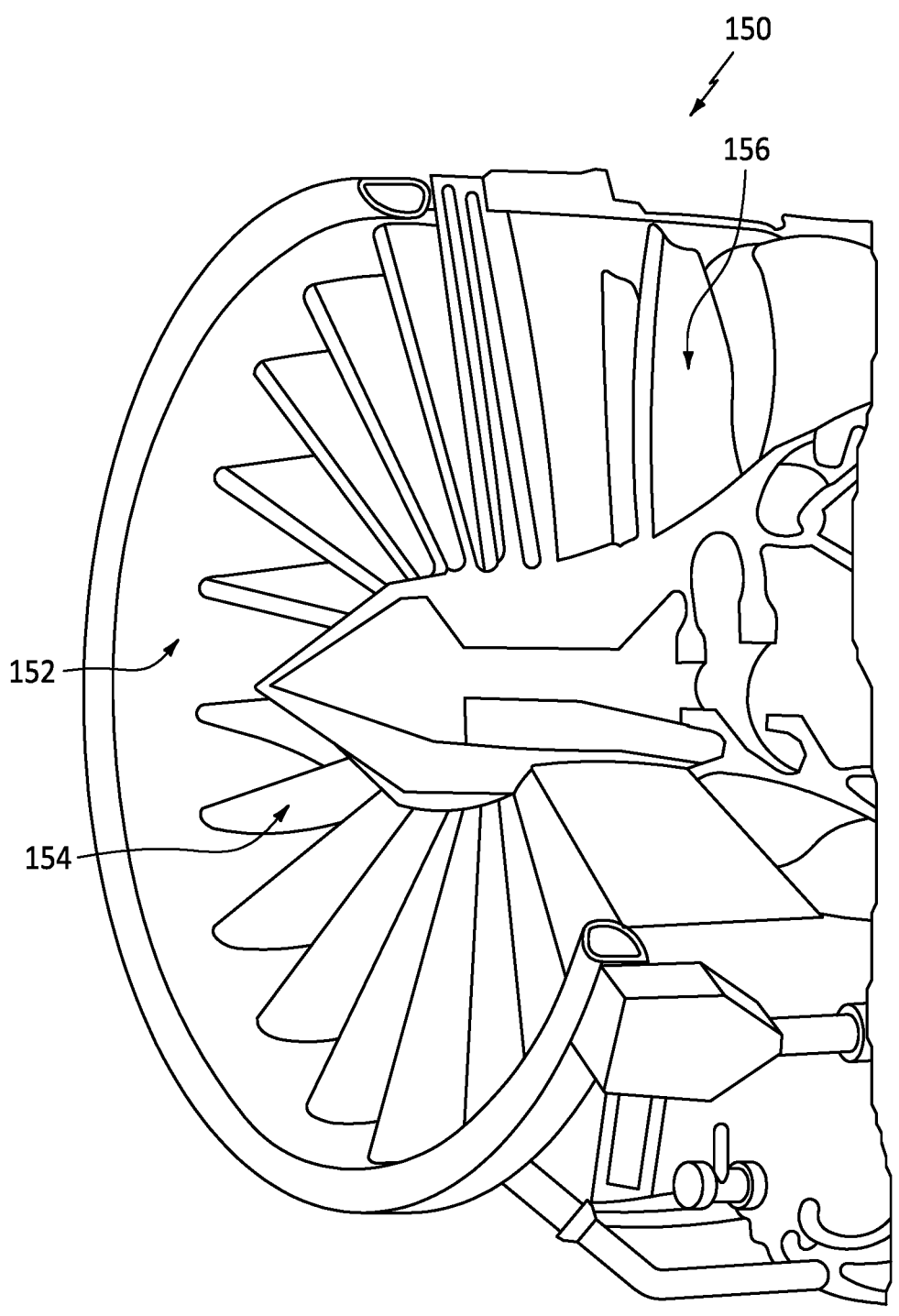
FIG. 3 is a partial cutaway view of an alternative engine.

The vanes 29 and the inboard surface of the fan case (e.g., along the hoop structure 100) bear an erosion coating. Similarly, a military style turbofan engine 150 (FIG. 3) may have an inlet case 152 and inlet vanes 154 (e.g., variable vanes) ahead of the fan 156 and which may bear an erosion coating. Example erosion coatings are silicone. These coatings are subject to damage.

FIG. 2 shows example damage sites 200 (hoop inboard surface), 202 (strut or vane leading edge), and 204 (strut or vane side (e.g., pressure or suction side)).

In an example on-aircraft (or off-aircraft) repair, a region around the damage site is prepared by cutting away (e.g., with a blade and optionally using a patch template) damaged coating and neighboring undamaged coating. The remaining coating edge may be chamfered or filleted (e.g., using an angled or curved blade). The curved blade provides a concave transition (fillet) from coating to exposed substrate. The exposed component substrate (e.g., a non-metallic composite or a metallic composite or alloy) may be cleaned and prepped for bonding. Example cleaning removes contaminants such as oil. Example cleaning techniques include use of a solution such as an aqueous solution including a surfactant or alkaline cleaning additive (e.g., spraying and wiping). One preparation option is hand abrasion such as by a metallic or non-metallic abrasive pad, sandpaper, or sanding cloth. A second option is an abrasive blasting method such as using a pencil blaster. A third option is the use of a plasma pen.

At least after abrasion and prior to patching, there may be a further cleaning. This cleaning functions to remove any particulate leftover from the abrasion. The example cleaning is done using solvent or alkaline cleaner (e.g., by wiping).

Figures 4, 5:
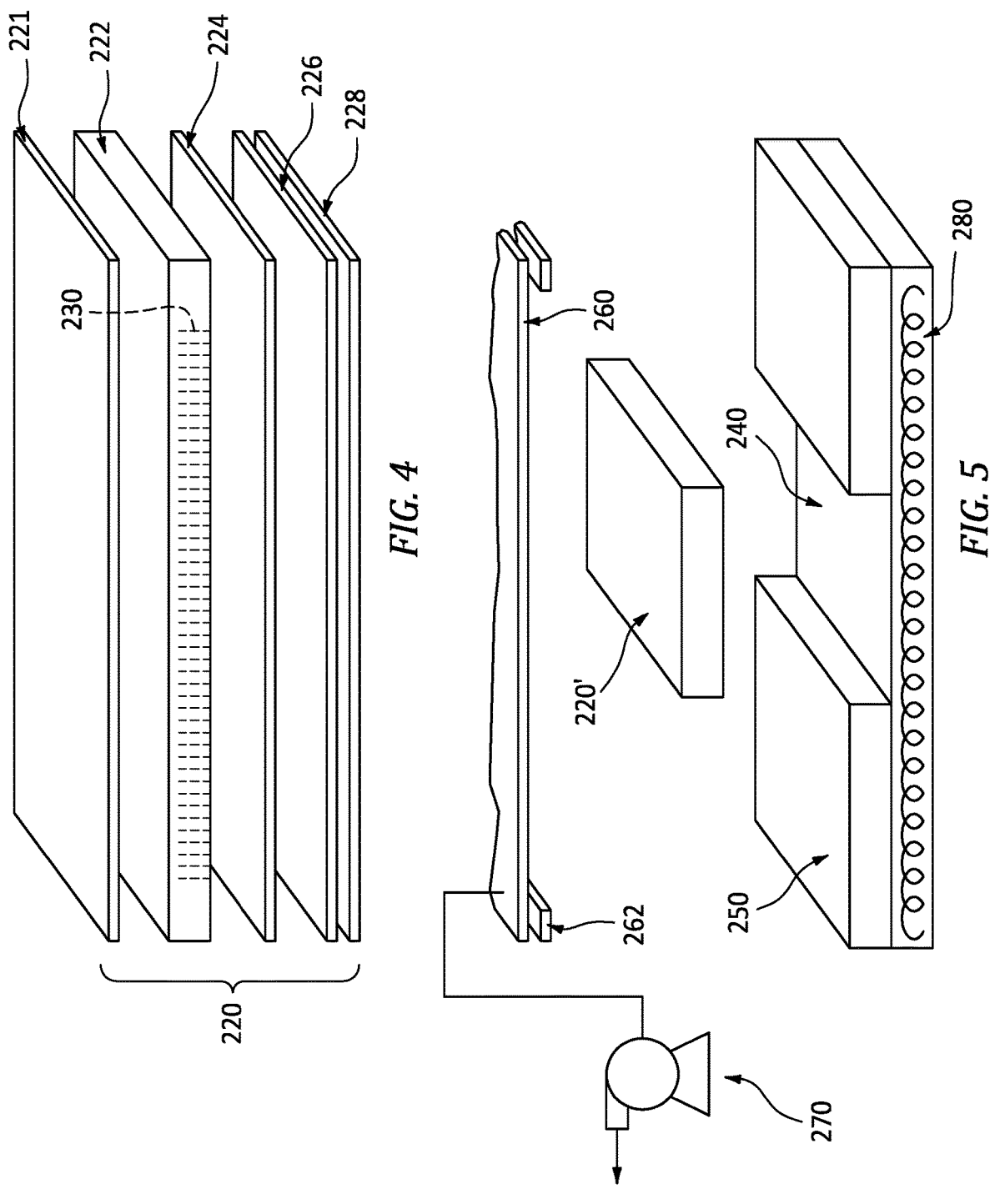
FIG. 4 is an exploded view of a patch.
FIG. 5 is a cutaway exploded view of a damage site being patched.

FIG. 4 shows a patch 220 (layering views not to scale). The patch has a polymeric substrate or patch material 222. Example patch material is a silicone. Alternative patch materials include urethane, fluoropolymer elastomer, or other erosion resistant elastomer. The material may be formed in flat sheets or in dedicated shapes for specific patches (e.g., an arcuate shape for leading edge repair). The illustrated example may be formed on a release medium (e.g., film or coated fabric or coated paper) 221. Example forming involves spraying.

A primer 224 may be applied to the underside of the patch material to improve bonding with the adhesive. Example primers are silanes or other compatible material. Example application is plasma, although hand application is an alternative. Example primer thickness is 0.2 to 2.0 micrometers or 0.3 to 0.7 micrometers. In a first example, after primer application and curing, an adhesive 226 is applied to the primed underside. In one example, the adhesive is a spray or solvent applied silicone (e.g., a peroxide-cured silicone, also known as a peroxide-cure silicone or a peroxide-curing silicone). A release medium (e.g., film or paper or coated fabric) 228 may be applied to cover the adhesive during shipping and storage.

In an alternative second example, the spray or solvent applied silicone adhesive is first applied to the release medium 228 (e.g., by spraying) and subsequently married to the primed patch material on the release medium 221. Example adhesive thickness is 10 to 40 micrometers or 15 to 40 micrometers.

An example coated fabric medium for the media 221 and 228 is a non-porous PTFE-coated woven fiberglass available from ACP Composites, Inc. of Livermore, California. Two example silicones for the patch material are R2180-2 or R2180-1 polysiloxane manufactured by NuSil Technology, LLC of Carpinteria, California. An example adhesive is Arlon 99020N015 silicone adhesive of Rogers Corporation of Chandler, Arizona. This adhesive is sold already formed on a release medium to form the medium 228. Alternative adhesives include epoxy, urethane or cyanoacrylate adhesives. Example silane primer is methylaminopropyl-trimethoxysilane. A commercial example is SP-273 manufactured by NuSil Technology, LLC of Carpinteria, California.

Alternatives involve not applying the adhesive until ready to repair. In such a case, a silicone paste or other adhesive may be applied just prior to bonding.

The patch material may be pre-cut in stock generic shapes (e.g., rounds, squares, rectangles, and the like of various sizes). The patch may also be cut into part geometry-specific shapes to accommodate specific areas. The sheeting, however, may be in larger bulk form or only custom cut out on site prior to repair.

In a further departure from the '220 patent, the example patch material 222 is at least partially perforated. FIG. 4 schematically shows perforations 230 extending from the inboard face of the patch substrate toward the outer release medium. Example perforations extend at least 50% of the thickness of the patch substrate, optionally at least 100%. In the latter case, the perforations may partially penetrate the outer release ply. Alternative ranges are at 50% to 99%, at least 80%, and 80% to 95%. Example thicknesses for the patch material is in the range 200 to 300 micrometers, more broadly 150 to 500 micrometers.

The example perforations do not involve material removal and, thus, are essentially closed in unstrained condition. Example perforations are local pin pricks having a perforation density of 3.0 perforations to 7.0 perforations per square centimeter, more broadly, 2.0 perforations to 10.0 perforations (e.g., over the entire patch such as when cut to shape). As is discussed below, the perforations may advantageously be small in transverse dimension to maintain physical integrity while still serving a venting function during installation. Example perforating pins/needles are 0.50 to 1.2 mm in diameter. These pins/needles (protrusions) may be on a needle roller rolled over the exposed face of the patch material 222 to partially penetrate or just fall shy of the release medium 221. This perforating step may occur before the priming but after at least partial cure (e.g., oven cure) so that immediate healing of the perforations is avoided.

With the damaged area removed and exposed substrate 240 (FIG. 5) cleaned, the exposed substrate of the damaged area may optionally be primed (e.g., via a hand-applied silane primer—e.g., moistened cloth rub for a thin layer). Example primer thickness is 0.2 to 2.0 micrometers or 0.3 to 0.7 micrometers. If need be, the patch may be cut to size and shape. The release film (if present) 228 is peeled off and the patch is applied. Optionally, the release medium 221 may also be peeled off leaving a patch 220' with exposed adhesive ready for application. An example patch application may include use of a roller to obtain firm engagement between the adhesive 226 and the component substrate. During the initial application, it is possible that air bubbles may become trapped between the patch and the component substrate. The bubbles may result from several causes. One is any imperfection/imprecision in the application and rolling. This may be particularly significant where the patch is wrapped around a small radius of curvature such as the leading edge of a vane or strut and wrinkles. Such bubbles may vent into the perforations and potentially pass completely outward by diffusion through or rupturing of the zone of the intact material (if present) 232 (FIG. 7) between ends of the perforations and the outer surface of the patch material 222. This may be particularly relevant to larger patches that are exposed to contour changes such as wrapping around the leading edge and/or extending substantially all the length of the pressure side and/or suction side.

Figure 6:
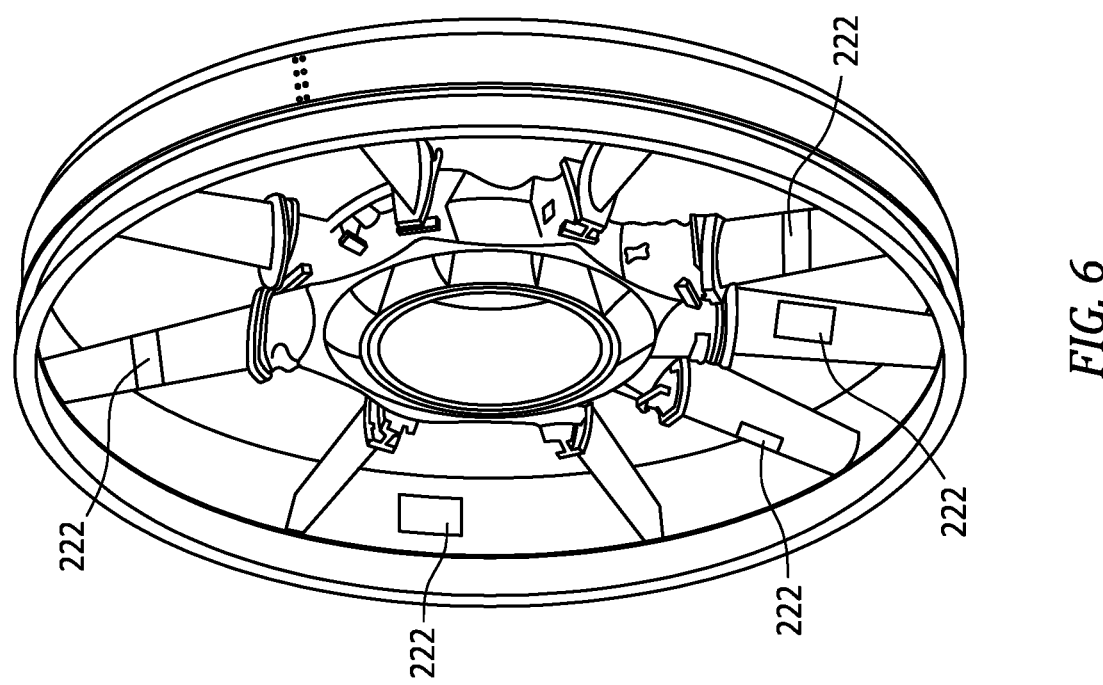
FIG. 6 is a view of the assembly of FIG. 2 after patching.
Figures 7, 13:
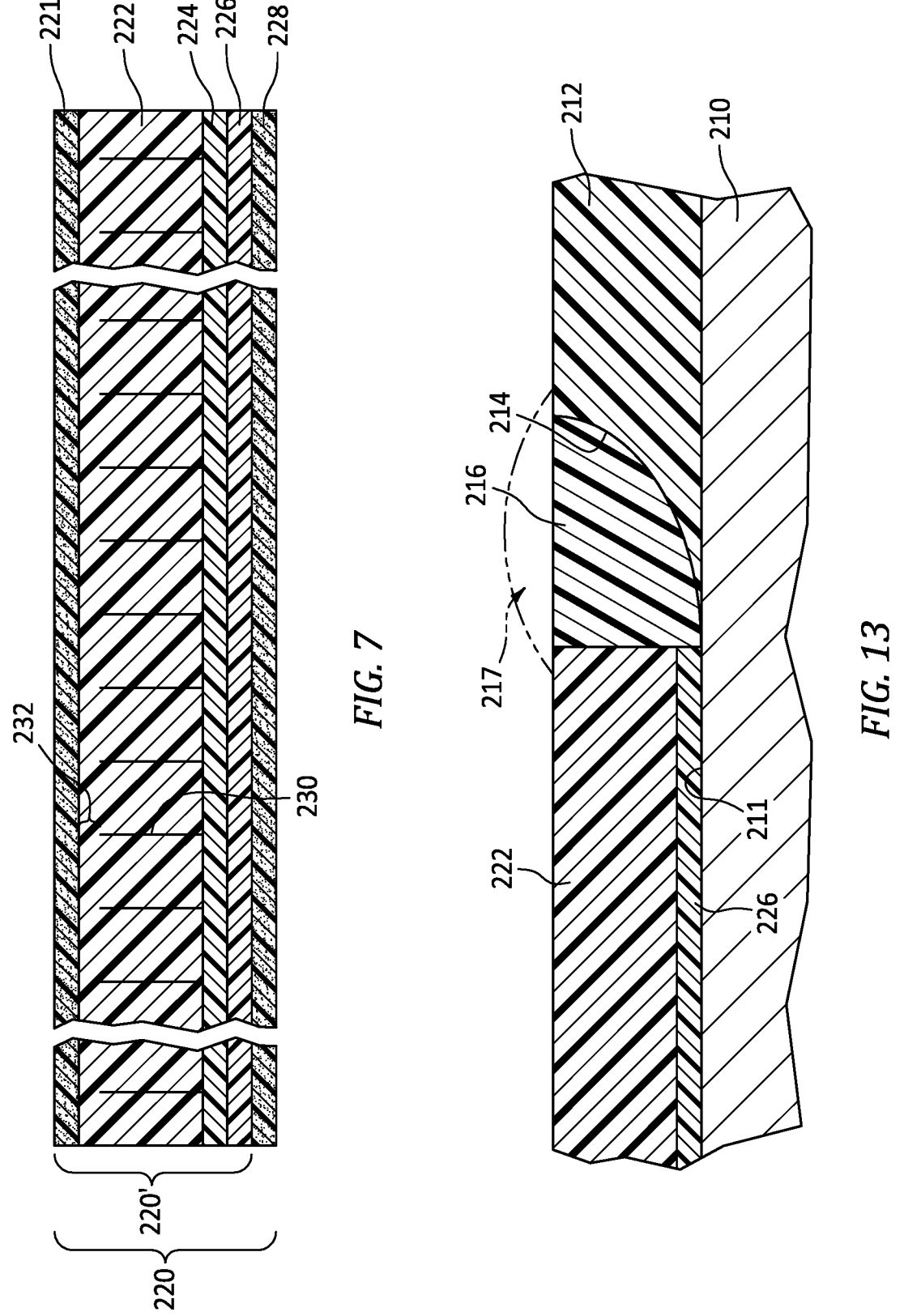
FIG. 7 is a schematic sectional view of the patch of FIG. 4.
FIG. 13 is a schematic sectional view of a repaired damage site.

After application, a further step may be to fill any peripheral gap or groove (e.g., from the fillet). This may be done using a silicone paste. A bead of paste may be applied (e.g., via syringe or nozzle). An example paste is R2186 silicone elastomer manufactured by NuSil Technology LLC of Carpinteria, California, a two-part, translucent, pourable silicone system. FIG. 13 shows an example repair site on a substrate 210 having a surface 211. An intact portion of the original erosion coating is shown as 212. This has a cut surface 214 formed by the preparation of the site using a curved blade to form an outwardly concave transition. FIG. 13 further shows the remnant 216 of the paste bead 217 after having been trimmed flush to the adjacent erosion coating 212 and patch material 222 to fill around the periphery of the patch. Example trimming is via a pre-cure scraping with a straight edge or other tool. The bead may be co-cured with the adhesive discussed below. Or, if applied after adhesive cure may be separately cured (e.g., oven or heat gun if not a room temperature cure). FIG. 6 shows several different patches on the damage sites of FIG. 2. The hoop inboard surface site 200 has been repaired with a small discrete patch as have been one of the vane or strut leading edge sites 202 and the adjacent vane's or strut's side surface. Two other leading edge damage sites have been repaired with patches wrapping around and extending to the trailing edge on both sides.

To facilitate cure of the adhesive, the patched site may be subject to elevated pressure and elevated temperature. Examples of elevated pressure methods included inflatable bladder, vacuum blanket, or autoclave. In one example, a vacuum blanket 260 (see the '220 patent), may be applied around the damage site and may be adhered 262 (e.g., to adjacent coated 250 areas (FIG. 5)) or otherwise secured (e.g., via strapping) or may rely on vacuum to secure (technically the external air pressure outside the vacuum exerting pressure on the patch). Vacuum is applied (e.g., via a pump 270). The heating may be external or internal. Example hoop and vane structures include internal electric de-icing systems 280 which may be engaged to provide heat. Alternatively, heated bladder (see the '608 publication) may be used to apply the pressure and heat. The adhesive cure pressure and heating may cause the perforations in patch material 222 to heal/seal (particularly if the patch material was previously only partially cured and this step causes further/full curing) or become plugged with cured adhesive. The bladder, blanket, or other tool may have a release film layer for contacting the patch and any bead around the perimeter. After removal of the bladder, blanket, or the like, the release material can be lightly stuck wither to the repair site or the tool and be peeled off.

After curing, pressure may be removed and the heat source disengaged. There may be optional trimming or other surface finishing.

Figure 8:
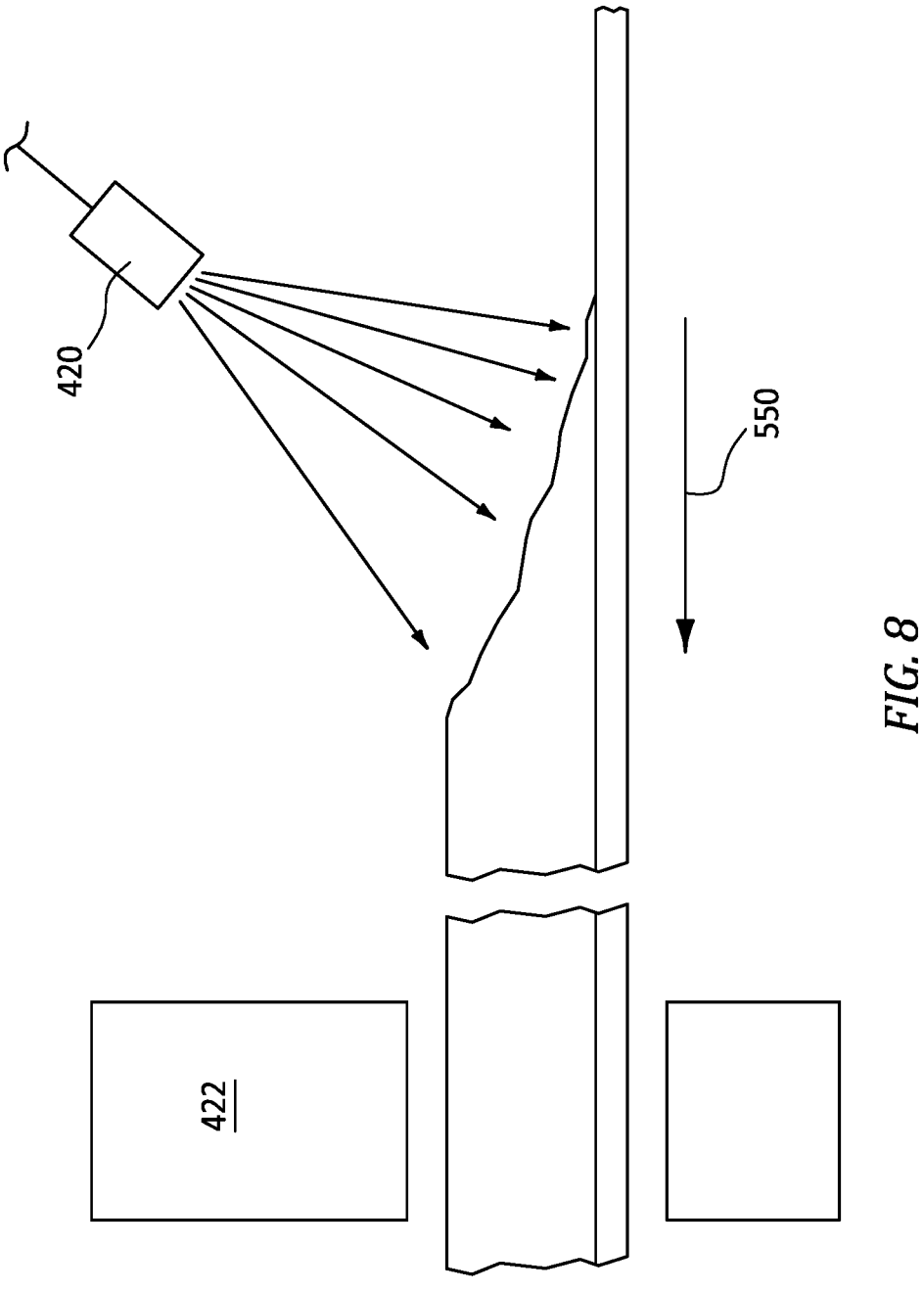
FIG. 8 is a schematic view of patch material being sprayed on a release medium in a continuous process.

A further variation is a continuous manufacture process wherein large rolls of release media are used. For example, the upstream end of the process may start with a roll of release ply material that ultimately forms the outer release strip 221. This material is unrolled and passes in a direction 550 through a sequence of stages. A first stage (FIG. 8) may be spraying of the patch substrate 222 via nozzles 420 onto one surface of the first release ply material. That surface, ultimately, forms the outer release strip 221 inboard surface.

Figure 9:
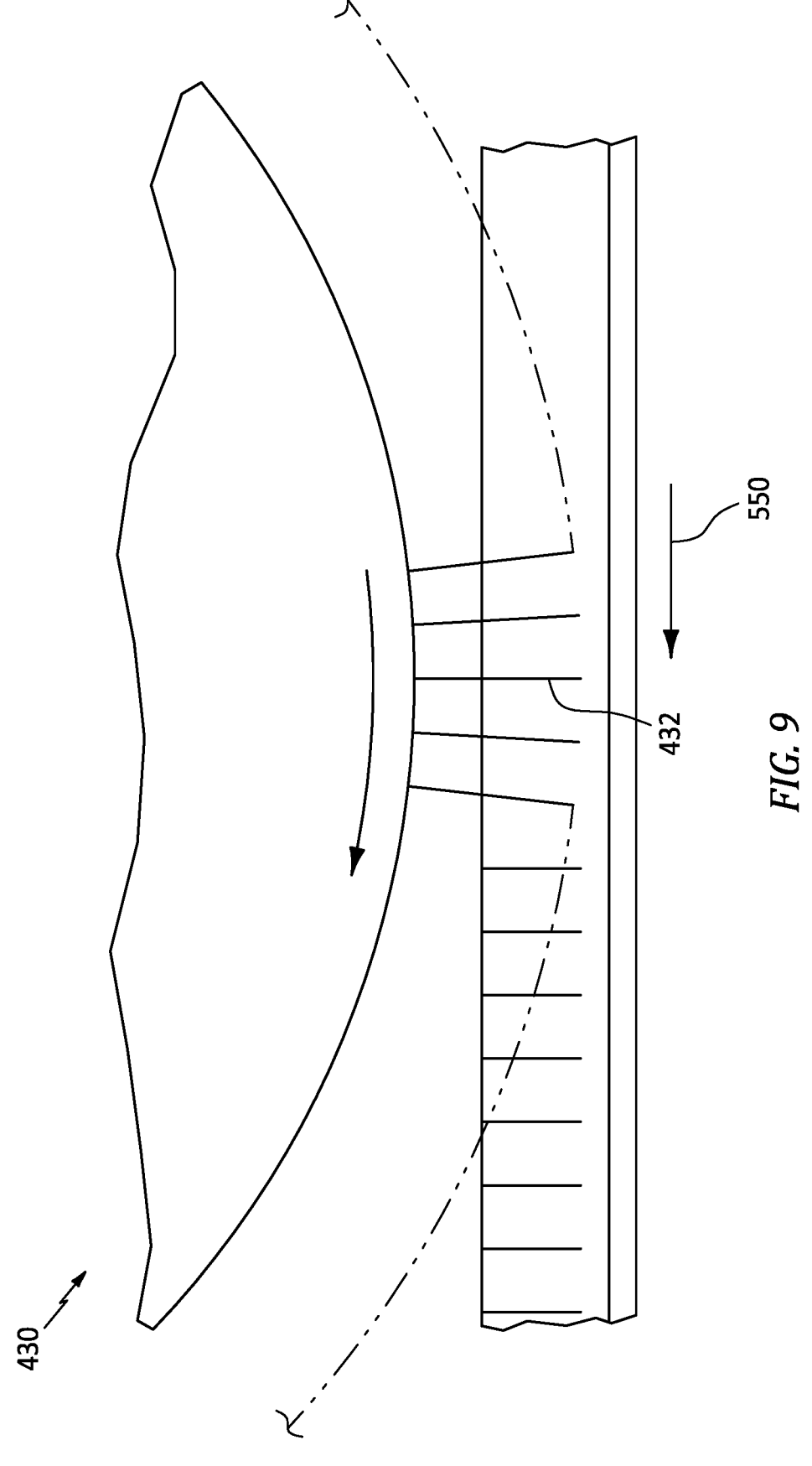
FIG. 9 is a schematic view of a perforating roller perforating the patch material after a partial curing.

This coated release ply may then pass through a curing oven 422 to partially or fully cure the patch material. The first release ply having erosion coating patch material then passes through the pin (needle) roller station 430 (FIG. 9) wherein the pins 432 at least partially pierce the patch material.

Figure 10:
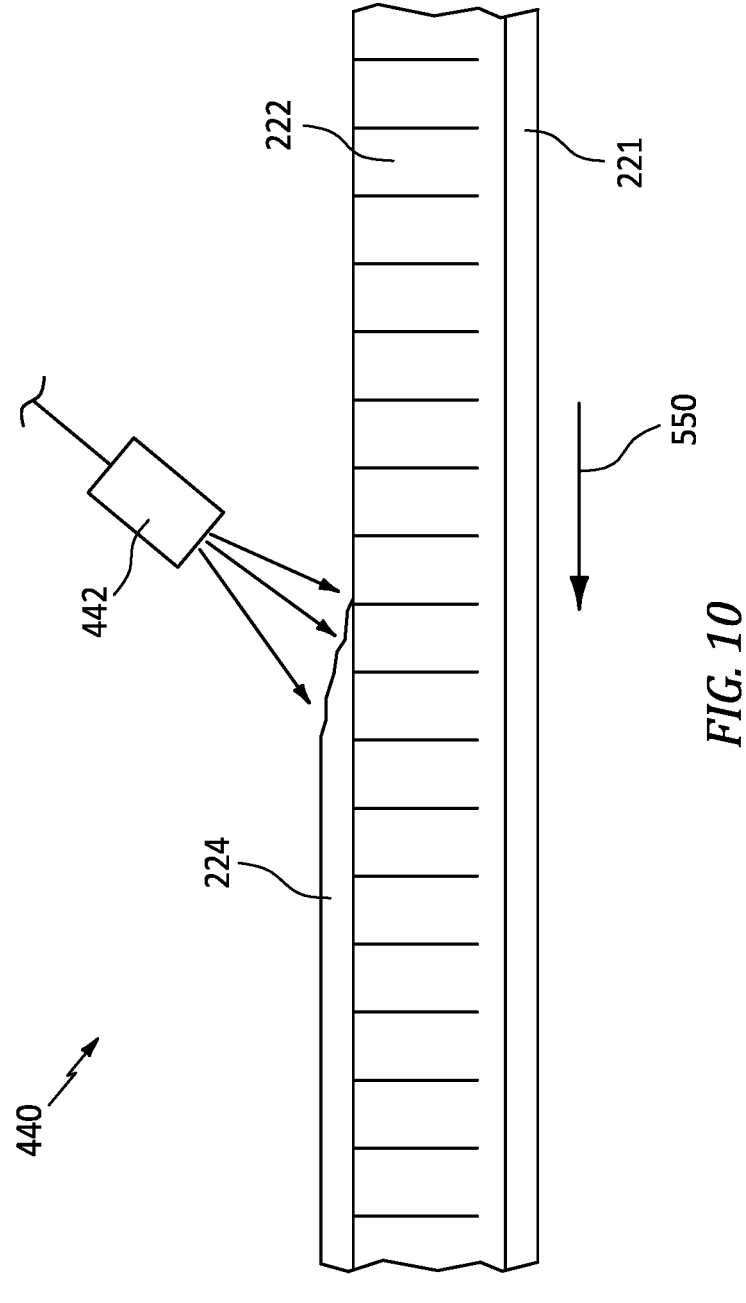
FIG. 10 is a view of primer being sprayed atop the patch material.

The first release ply with pierced substrate material then passes through a priming station 440 (FIG. 10) wherein liquid primer is applied. The example primer is a silane primer. Example application is a spray application via nozzles 442.

The primed material may then cure at room temperature by having a controlled length of passage to the next station, particularly to cure the primer. The next station may be a temporary rolling station for storage or may be directly to marriage with the adhesive.

Figure 11:
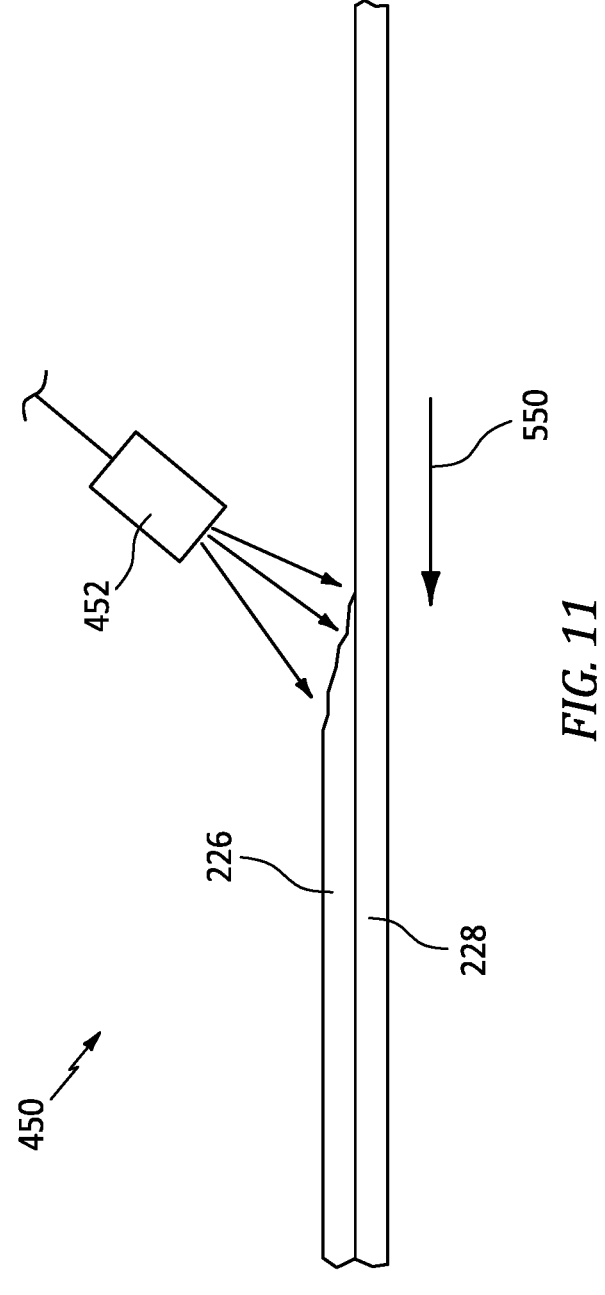
FIG. 11 is a view of an adhesive being sprayed to a second release medium in a continuous process.

In parallel, a second release ply (which ultimately forms the inboard release strip) is unrolled and passes through a station 450 (FIG. 11) wherein solvated adhesive is applied to one face (which ultimately forms the outboard face of the inner release strip) such as by spraying from nozzles 452.

Figure 12:
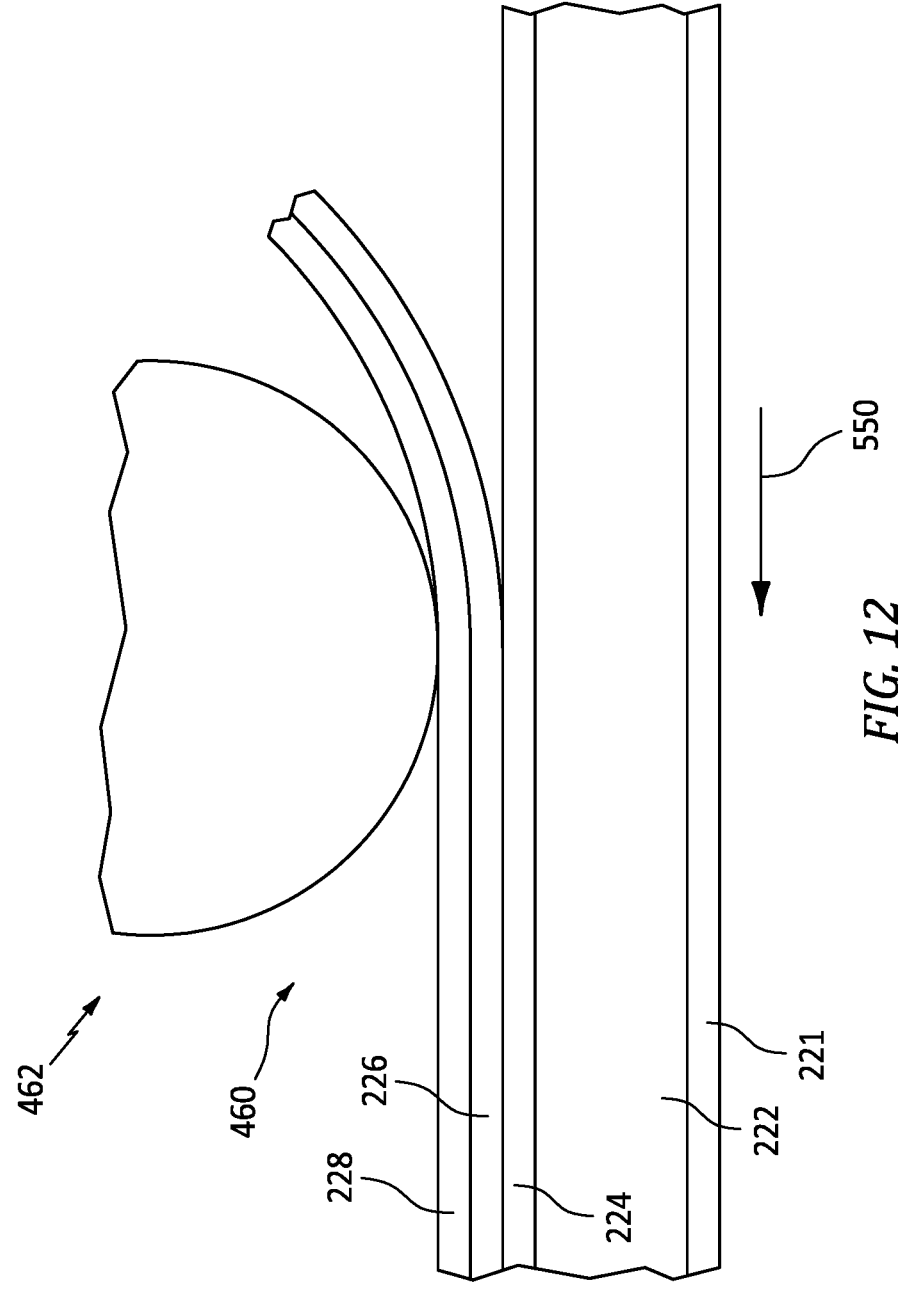
FIG. 12 is a view of the first release medium and primed patch material being married to the second release medium and adhesive.

The two release plies and their coatings then married at a station 460 (FIG. 12) with the exposed adhesive surface contacting the silane primer. Bonding may be assured with light pressure application such as passing through a roller (e.g., a lightweight plastic roller) 462. Again, this married material may either pass directly to a cutting station or may be rolled for subsequent cutting.

In the example of immediately passing to a cutting station, the cutting station may die cut (e.g., via a rolling die).

The cut pieces may then be sealed in vacuum pouches in order to prevent adhesive degradation/oxidation. Example vacuum pouches are formed of BoPET (biaxially-oriented polyethylene terephthalate) polyester film.

In a further variation on the batch or continuous processes, a final outer release medium 221 may not be the same physical release medium piece to which the patch material 222 is sprayed. When the patch material 222 is sprayed, the exposed surface of the patch material may have a different texture than the surface contacting the medium on which the patch material is sprayed. Specifically, the exposed surface may have a different appearance. For example, when sprayed to a coated fabric release medium, the face from which the medium is removed is may be relatively matte in appearance. Thus, the patch material 222 may be sprayed on a release medium (which may be the same material as the other release media discussed) that is sacrificed. Specifically, after the partial cure and before the perforating, a second release medium (which forms the ultimate medium 221) is applied to the exposed face of the partially cured sprayed patch material 222 (the glossier face in the noted example). The initial release medium may then be peeled off the opposite face (the rougher or more matte-appearing face) and the perforations applied through that newly-exposed face. The process may continue as discussed above. In the identified example, the glossier face then becomes the one seen after application to the repair area and removal of the release medium.

The use of "first", "second", and the like in the following claims is for differentiation within the claim only and does not necessarily indicate relative or absolute importance or temporal order. Similarly, the identification in a claim of one element as "first" (or the like) does not preclude such "first" element from identifying an element that is referred to as "second" (or the like) in another claim or in the description.

One or more embodiments have been described. Nevertheless, it will be understood that various modifications may be made. For example, when applied to an existing baseline configuration, details of such baseline may influence details of particular implementations. Accordingly, other embodiments are within the scope of the following claims.

What is claimed is:

1. A patch comprising:
a silicone body;
a silane primer on an underside of the body;
a silicone adhesive on the primer;
a first release strip on the silicone body; and
a second release strip on the adhesive,
wherein:
the adhesive is a peroxide-cured silicone; and
the body has a plurality of perforations.

2. The patch of claim 1 wherein:
the perforations only partially penetrate the body.

3. The patch of claim 2 wherein:
a density of the perforations is 2.0 perforations to 10.0 perforations per square centimeter.

4. The patch of claim 3 wherein:
the first and second release strips are coated fabric.

5. The patch of claim 2 wherein:
the first and second release strips are coated fabric.

6. The patch of claim 5 wherein:
a density of the perforations is 2.0 perforations to 10.0 perforations per square centimeter.

7. The patch of claim 2 wherein:
the perforations penetrate at least 50% of a thickness of the silicone patch material.

8. The patch of claim 7 wherein:
the first and second release strips are coated fabric.

9. The patch of claim 8 wherein:
a density of the perforations is 2.0 perforations to 10.0 perforations per square centimeter.

10. The patch of claim 7 wherein:
a density of the perforations is 2.0 perforations to 10.0 perforations per square centimeter.

11. The patch of claim 1 wherein:
the perforations penetrate at least 50% of a thickness of the silicone patch material.

12. The patch of claim 11 wherein:

the first and second release strips are coated fabric.

13. The patch of claim 12 wherein:

a density of the perforations is 2.0 perforations to 10.0 perforations per square centimeter.

14. A method for patching a damaged polymeric erosion coating on a gas turbine engine component using the patch of claim 1, the method comprising:

removing a portion of the coating around a damage site;

priming the component;

removing the second release strip to expose the adhesive;

applying the patch so that the adhesive contacts the component; and rolling the patch with a roller.

15. The method of claim 14 wherein:

the priming is with a silane primer.

16. The method of claim 14 further comprising:

applying pressure to the patch; and heating the patch while the pressure is applied.

17. The method of claim 14 wherein:

the method is performed in situ with the engine on an aircraft.

18. The method of claim 14 wherein:

the damage site is along a leading edge of a fan inlet strut or fan exit strut.

19. The method of claim 14 wherein:

the damage site has a polymer matrix composite substrate.

20. A method for manufacturing the patch of claim 1, the method comprising:

forming the silicone body on a first release ply for forming the first release strip and at least partially curing the silicone body on the first release ply;

perforating the silicone body to form the perforations;

applying the adhesive to a second release ply for forming the second release strip;

applying the peroxide-cured primer to the perforated silicone body; and marrying the primed perforated silicone body to the adhesive.

* * * * *